United States Patent
Kurose

(10) Patent No.: US 9,245,215 B2
(45) Date of Patent: Jan. 26, 2016

(54) IMAGE PROCESSING DEVICE FOR GENERATING AND PRINTING IMAGE DATA FOR ONE OR SOME OF COLORS AT A HIGHER RESOLUTION THAN THE OTHER COLORS

(71) Applicant: RISO KAGAKU CORPORATION, Tokyo (JP)

(72) Inventor: Tsutomu Kurose, Ibaraki (JP)

(73) Assignee: RISO KAGAKU CORPORATION, Tokyo (JP)

( * ) Notice: Subject to any disclaimer, the term of this patent is extended or adjusted under 35 U.S.C. 154(b) by 0 days.

(21) Appl. No.: 14/541,692

(22) Filed: Nov. 14, 2014

(65) Prior Publication Data
US 2015/0154479 A1   Jun. 4, 2015

(30) Foreign Application Priority Data
Nov. 29, 2013   (JP) .................................. 2013-247722

(51) Int. Cl.
  *G06K 15/02*   (2006.01)
  *G06K 15/10*   (2006.01)
(52) U.S. Cl.
  CPC .......... *G06K 15/1878* (2013.01); *G06K 15/102* (2013.01); *G06K 15/188* (2013.01); *G06K 15/1853* (2013.01); *G06K 15/1881* (2013.01); *G06K 2215/0094* (2013.01); *G06K 2215/101* (2013.01)
(58) Field of Classification Search
  None
  See application file for complete search history.

(56) References Cited

U.S. PATENT DOCUMENTS

| | | | | | |
|---|---|---|---|---|---|
| 5,975,673 | A | * | 11/1999 | Ohtsuka | G06K 15/102 347/15 |
| 2007/0223043 | A1 | * | 9/2007 | Sugimoto | H04N 1/4052 358/3.01 |

FOREIGN PATENT DOCUMENTS

JP   2010-45634   2/2010

OTHER PUBLICATIONS

U.S. Appl. No. 14/541,568 to Toshihiro Bansyo, filed Nov. 14, 2014.

* cited by examiner

*Primary Examiner* — Barbara Reinier
*Assistant Examiner* — Pawandeep Dhingra
(74) *Attorney, Agent, or Firm* — Greenblum & Bernstein, P.L.C.

(57) ABSTRACT

A density corrector performs a density correction processing on a resolution-converted image dataset to obtain a density-corrected image dataset by: determining whether each of first and second pixels in the resolution-converted image dataset is a deletion-target pixel, the first pixels each being a pixel located at a position including a longitudinal edge in a second original image, the second pixels each being a pixel located at a position including a lateral edge in the second original image, patterns of edges in regions in the first and second original images corresponding to the deletion-target pixel being the same; correcting a density of the deletion-target pixel to "0"; and correcting a density of respective pixels other than the deletion-target pixel among the first and second pixels to a value equal to or larger than an original density of the respective pixels.

2 Claims, 9 Drawing Sheets

51

| 0 | 1 | 1 |
| 0 | 1 | 1 |
| 0 | 1 | 1 |

52

| 1 | 1 | 0 |
| 1 | 1 | 0 |
| 1 | 1 | 0 |

53

| 0 | 0 | 0 |
| 1 | 1 | 1 |
| 1 | 1 | 1 |

54

| 1 | 1 | 1 |
| 1 | 1 | 1 |
| 0 | 0 | 0 |

FIG. 7

|  | | | | | | | | | | | | |
|---|---|---|---|---|---|---|---|---|---|---|---|---|
| LA1 | 0 | 0 | 0 | 0 | 0 | 0 | 0 | 0 | 0 | 0 | 0 | 0 |
| LA2 | 255 | 255 | 255 | 255 | 255 | 255 | 255 | 255 | 255 | 255 | 255 | 255 |
| LA3 | 255 | 255 | 255 | 255 | 255 | 255 | 255 | 255 | 255 | 255 | 255 | 255 |
| LA4 | 255 | 255 | 255 | 255 | 255 | 255 | 255 | 255 | 255 | 255 | 255 | 255 |
| LA5 | 255 | 255 | 255 | 255 | 255 | 255 | 255 | 255 | 255 | 255 | 255 | 255 |
| LA6 | 255 | 255 | 255 | 255 | 255 | 255 | 255 | 255 | 255 | 255 | 255 | 255 |
| LA7 | 255 | 255 | 255 | 255 | 255 | 255 | 255 | 255 | 255 | 255 | 255 | 255 |
| LA8 | 0 | 0 | 0 | 0 | 0 | 0 | 0 | 0 | 0 | 0 | 0 | 0 |

FIG. 8

|  | | | | | | |
|---|---|---|---|---|---|---|
| LB1 | 128 | 128 | 128 | 128 | 128 | 128 |
| LB2 | 255 | 255 | 255 | 255 | 255 | 255 |
| LB3 | 255 | 255 | 255 | 255 | 255 | 255 |
| LB4 | 128 | 128 | 128 | 128 | 128 | 128 |

FIG. 9

|  | | | | | | | | | | | | |
|---|---|---|---|---|---|---|---|---|---|---|---|---|
| LA1 | 0 | 0 | 0 | 0 | 0 | 0 | 0 | 0 | 0 | 0 | 0 | 0 |
| LA2 | 0 | 0 | 0 | 0 | 0 | 0 | 0 | 0 | 0 | 0 | 0 | 0 |
| LA3 | 255 | 255 | 255 | 255 | 255 | 255 | 255 | 255 | 255 | 255 | 255 | 255 |
| LA4 | 255 | 255 | 255 | 255 | 255 | 255 | 255 | 255 | 255 | 255 | 255 | 255 |
| LA5 | 255 | 255 | 255 | 255 | 255 | 255 | 255 | 255 | 255 | 255 | 255 | 255 |
| LA6 | 255 | 255 | 255 | 255 | 255 | 255 | 255 | 255 | 255 | 255 | 255 | 255 |
| LA7 | 255 | 255 | 255 | 255 | 255 | 255 | 255 | 255 | 255 | 255 | 255 | 255 |
| LA8 | 0 | 0 | 0 | 0 | 0 | 0 | 0 | 0 | 0 | 0 | 0 | 0 |

FIG. 10

|  | | | | | | |
|---|---|---|---|---|---|---|
| LB1 | 235 | 235 | 235 | 235 | 235 | 235 |
| LB2 | 255 | 255 | 255 | 255 | 255 | 255 |
| LB3 | 255 | 255 | 255 | 255 | 255 | 255 |
| LB4 | 0 | 0 | 0 | 0 | 0 | 0 |

FIG. 11

|  | | | | | | | | | | | | |
|---|---|---|---|---|---|---|---|---|---|---|---|---|
| LA1 | 0 | 0 | 0 | 0 | 0 | 0 | 0 | 0 | 0 | 0 | 0 | 0 |
| LA2 | 0 | 0 | 0 | 0 | 0 | 0 | 0 | 0 | 0 | 0 | 0 | 0 |
| LA3 | 2 | 2 | 2 | 2 | 2 | 2 | 2 | 2 | 2 | 2 | 2 | 2 |
| LA4 | 2 | 2 | 2 | 2 | 2 | 2 | 2 | 2 | 2 | 2 | 2 | 2 |
| LA5 | 2 | 2 | 2 | 2 | 2 | 2 | 2 | 2 | 2 | 2 | 2 | 2 |
| LA6 | 2 | 2 | 2 | 2 | 2 | 2 | 2 | 2 | 2 | 2 | 2 | 2 |
| LA7 | 2 | 2 | 2 | 2 | 2 | 2 | 2 | 2 | 2 | 2 | 2 | 2 |
| LA8 | 0 | 0 | 0 | 0 | 0 | 0 | 0 | 0 | 0 | 0 | 0 | 0 |

FIG. 12

|  | | | | | | |
|---|---|---|---|---|---|---|
| LB1 | 7 | 7 | 7 | 7 | 7 | 7 |
| LB2 | 7 | 7 | 7 | 7 | 7 | 7 |
| LB3 | 7 | 7 | 7 | 7 | 7 | 7 |
| LB4 | 0 | 0 | 0 | 0 | 0 | 0 |

IMAGE PROCESSING DEVICE FOR GENERATING AND PRINTING IMAGE DATA FOR ONE OR SOME OF COLORS AT A HIGHER RESOLUTION THAN THE OTHER COLORS

CROSS REFERENCE TO RELATED APPLICATION

This application is based upon and claims the benefit of priority from the prior Japanese Patent Application No. 2013-247722, filed on Nov. 29, 2013, the entire contents of which are incorporated herein by reference.

BACKGROUND

1. Technical Field

The disclosure relates to an image processing device that generates print image data to be used in print operation performed by a printing machine, and also relates to a printing machine with the image processing device.

2. Related Art

Some printing machines are equipped with a text smoothing function for making the contours of printed text look smooth. Such a printing machine performs print operation as follows.

First, the printing machine performs raster image processor (RIP) processing on data in a page description language (PDL) at a resolution higher than a print resolution. Then, the printing machine performs resolution conversion to convert the high-resolution image data (raster data) obtained by the RIP processing into low-resolution (print-resolution) image data. The printing machine performs the resolution conversion by setting the density of each pixel in the low-resolution image data to an average density of corresponding pixels in the high-resolution image data in a number determined according to the ratio between the resolutions before and after the resolution conversion. Thereafter, the printing machine performs halftone processing on the low-resolution image data to generate print image data in printable format. Then, the printing machine prints an image by use of the print image data.

When an image is printed using the text smoothing function described above, the density averaging for the resolution conversion causes an edge portion of the image, such as text, to be printed at a lower density than in a case not using the text smoothing function. This brings about an advantageous effect of making the slanted contours or the like of the text slightly blur and look smooth, but meanwhile, makes jaggedness or the like of longitudinal or lateral lines more stand out.

If, for example, a multi-drop inkjet printing machine employs the text smoothing function, an edge portion is printed at lower density. Accordingly, in pixels of the edge portion, smaller dots are formed with a smaller number of drops, than in a case not using the text smoothing function. Thereby, a slanted edge portion of a slanted text line or the like slightly blurs and looks smooth. Meanwhile, since dots are small, jaggedness or the like of a longitudinal or lateral edge portion of a longitudinal or lateral line or the like stands out because of large inter-dot gaps.

Japanese Unexamined Patent Application Publication No. 2010-45634 discloses a technique for coping with such a problem. This technique corrects the density at the edge of an image in image data whose resolution has been converted from high resolution to low resolution. Thereby, the above-described jaggedness at the edge portion of a printed image can be suppressed.

SUMMARY

Among printing machines capable of printing an image with multiple colors of recording materials (such as ink), there is a printing machine capable of printing one or some of the colors at a higher resolution than the other colors.

For example, a printing machine may print black (K) at 600×600 dpi and print each of cyan (C), magenta (M), and yellow (Y) at 300×300 dpi. Such a printing machine may perform print operation as follows.

First, the printing machine performs RIP processing on data in a PDL at 600×600 dpi. Next, the printing machine performs color conversion on the image data in RGB format obtained by the RIP processing, and thereby generates 600×600-dpi image datasets for black, cyan, magenta, and yellow. Next, the printing machine performs resolution conversion to convert the 600×600-dpi image datasets for cyan, magenta, and yellow into 300×300-dpi image datasets through density averaging. Specifically, the printing machine converts the 600×600-dpi image datasets for cyan, magenta, and yellow into the 300×300-dpi image datasets by setting the density of each pixel in the 300×300-dpi image data to an average density of a group of 2×2 pixels in the 600×600-dpi image dataset.

Next, the printing machine performs halftone processing on the 600×600-dpi image dataset for black and the resolution-converted, 300×300-dpi image datasets for the other three colors, and thereby generates print image datasets for the respective colors. The printing machine then prints an image by using these print image datasets.

In the above print operation, the resolution of image datasets for cyan, magenta, and yellow are subjected to the resolution conversion from high resolution (600×600 dpi) to low resolution (300×300 dpi) by using density averaging. Thus, the images for these three colors that are printed at low resolution attain the text smoothing effect described above. Specifically, the contours of slanted text lines or the like look smooth. Meanwhile, the jaggedness or the like of longitudinal and lateral lines tend to stand out.

The jaggedness or the like of a longitudinal or lateral line or the like can be suppressed by correcting, or specifically increasing, the density at the edge of an image in image datasets whose resolution has been converted from high resolution to low resolution, as in the technique described in Japanese Unexamined Patent Application Publication No. 2010-45634.

When a 300×300-dpi image dataset converted from 600×600-dpi image dataset through density averaging as described above is printed, the edge of the image may spread outward, compared to a case where the 600×600-dpi image dataset is printed without the resolution conversion.

For example, consider a group of 2×2 pixels in a lateral edge portion of an image in a 600×600-dpi image dataset, with the lower two pixels having a density of "255" and the upper two pixels having a density of "0". The average density of this group of four pixels is "128". Resolution conversion to 300×300 dpi replaces this group of pixels by one pixel having a density of "128". Consequently, the edge printed at 300×300 dpi spreads upward by one 600×600-dpi line from the edge printed at 600×600 dpi.

Thus, a color other than black, which does not stick out from the black in the original image data, may be printed to stick out from black which is printed at 600×600 dpi. When the above-described correction is performed to increase the density at the edge of an image in the resolution-converted image dataset, the portion where the other color is printed to stick out from black is likely to stand out. This leads to degradation of the quality of a printed image.

An object of the present invention is to provide an image processing device capable of mitigating degradation of the quality of an image printed by a printing machine configured to print a certain color at high resolution and another color at low resolution.

An image processing device in accordance with some embodiments includes: an original image data acquirer configured to acquire original image datasets for a plurality of colors each having a first resolution, the plurality of colors including a first-resolution print color to be printed at the first resolution and a second-resolution print color to be printed at a second resolution lower than the first resolution and different from the first-resolution print color, the original image datasets including a first original image dataset for the first-resolution print color and a second original image dataset for the second-resolution print color; an edge detector configured to detect a longitudinal edge and a lateral edge of each of a first image in the first original image dataset and a second image in the second original image dataset; a resolution converter configured to convert the first resolution of the second original image dataset into the second resolution by performing a density averaging on each group of a plurality of pixels of the second original image dataset having the first resolution, to obtain a resolution-converted image dataset; a density corrector configured to perform a density correction processing on the resolution-converted image dataset to obtain a density-corrected image dataset by determining whether pixels in the resolution-converted image dataset include first pixels each being a pixel located at a position including the longitudinal edge in the second image, determining whether the pixels in the resolution-converted image dataset include second pixels each being a pixel located at a position including the lateral edge in the second image, upon determining that the pixels include the first pixels, determining whether each of the first pixels is a first deletion-target pixel, patterns of the longitudinal edges in regions in the first and second images corresponding to the first deletion-target pixel being the same, upon determining that the pixels include the second pixels, determining whether each of the second pixels is a second deletion-target pixel, patterns of the longitudinal edges in regions in the first and second images corresponding to the second deletion-target pixel being the same, correcting a density of the first and second deletion-target pixels to "0", and correcting a density of respective pixels other than the first and second deletion-target pixels among the first and second pixels to a value equal to or larger than an original density of the respective pixels; and a print image data generator configured to generate print image datasets for the respective plurality of colors based on the first original dataset and the density-corrected image dataset, the print image datasets being in a format supported by a printing machine capable of printing the first-resolution print color at the first resolution and the second-resolution print color at the second resolution.

A printing machine in accordance with some embodiments includes: a print unit configured to print a first-resolution print color being at least one of a plurality of colors at a first resolution, and to print a second-resolution print color different from the first-resolution print color at a second resolution lower than the first resolution; and an image processor (image processing device) programmed to generate print image datasets for the plurality of colors to be used by the print unit to perform print operation. The image processor includes: an original image data acquirer configured to acquire original image datasets for the plurality of colors each having the first resolution, the original image datasets including a first original image dataset for the first-resolution print color and a second original image dataset for the second-resolution print color; an edge detector configured to detect a longitudinal edge and a lateral edge of each of a first image in the first original image dataset and a second image in the second original image dataset; a resolution converter configured to convert the first resolution of the second original image dataset into the second resolution by performing a density averaging on each group of a plurality of pixels of the second original image dataset having the first resolution, to obtain a resolution-converted image dataset; a density corrector configured to perform a density correction processing on the resolution-converted image dataset to obtain a density-corrected image dataset by determining whether pixels in the resolution-converted image dataset include first pixels each being a pixel located at a position including the longitudinal edge in the second image, determining whether the pixels in the resolution-converted image dataset include second pixels each being a pixel located at a position including the lateral edge in the second image, upon determining that the pixels include the first pixels, determining whether each of the first pixels is a first deletion-target pixel, patterns of the longitudinal edges in regions in the first and second images corresponding to the first deletion-target pixel being the same, upon determining that the pixels include the second pixels, determining whether each of the second pixels is a second deletion-target pixel, patterns of the longitudinal edges in regions in the first and second images corresponding to the second deletion-target pixel being the same, correcting a density of the first and second deletion-target pixels to "0", and correcting a density of respective pixels other than the first and second deletion-target pixels among the first and second pixels to a value equal to or larger than an original density of the respective pixels; and a print image data generator configured to generate the print image datasets for the respective plurality of colors based on the first original dataset and the density-corrected image dataset, the print image datasets being in a format supported by the printing unit.

An image processing device in accordance with some embodiments for generating print image datasets for a plurality of colors used in a printing machine which prints at least one color of the plurality of colors at a first resolution and the other color at a second resolution lower than the first resolution, includes: an original image data acquirer configured to acquire original image datasets for the plurality of colors each having the first resolution; an edge detector configured to detect a longitudinal edge and a lateral edge of an image in each of the original image datasets for the respective colors; a resolution converter configured to convert a resolution of the original image dataset for a second-resolution print color to be printed at the second resolution into the second resolution by performing density averaging on each group of a plurality of corresponding pixels of the original image dataset having the first resolution; a density corrector configured to perform density correction processing by correcting a density of a deletion-target pixel to "0" and correcting a density of a pixel other than the deletion-target pixel to a value equal to or larger than an original density thereof, the deletion-target pixel being a pixel, among pixels located at a position including the longitudinal edge and located at a position including the lateral edge in an image of the original image dataset having the second resolution in the image dataset for the second-resolution print color with the resolution being converted, containing an edge in a region which corresponds to the pixels in an image in the original image dataset for a first-resolution print color to be printed in at least one color at the first resolution having a same pattern of an edge in a region which corresponds to the pixels in an image in the original image dataset for the second-resolution print color; and a print image data generator configured to generate the print image datasets for the respective colors in format supported by the printing machine, based on the original dataset for the first resolution print color and the image dataset for the second-resolution print color after the density correction processing.

According to the above configuration, for each of pixels (first and second pixels) which are in the resolution-converted image dataset for the second-resolution print color and located at a position including a longitudinal edge or a lateral edge in an image in the original image dataset for the second-resolution print color, the density corrector determines whether the pixel is a deletion-target pixel or not. Then, the density corrector sets the density of the pixel to "0" if the pixel is a deletion-target pixel (first and second deletion-target pixels), and corrects the density of the pixel to a value equal to or larger than its original density if the pixel is not a deletion-target pixel. Thereby, jaggedness or the like of a longitudinal line, a lateral line, or the like of the second-resolution print color can be suppressed in a printed image, and sticking out of the second-resolution print color from the first-resolution print color can be suppressed.

Thus, degradation of the quality of a printed image can be mitigated for a printing machine configured to print a certain color at high resolution (first resolution) and another color at low resolution (second resolution).

Depending on a combination of the second-resolution print color and the first-resolution print color, the density corrector may be configured to omit the correction of the density of the first and second deletion-target pixels to "0" in the resolution-converted image dataset.

According to the above configuration, depending on a combination of the second-resolution print color and the first-resolution print color, the density corrector omits the correction of the density of the deletion-target pixel (first and second deletion-target pixels) to "0" in the resolution-converted image dataset for the second-resolution print color.

BRIEF DESCRIPTION OF DRAWINGS

FIG. 7 is a diagram showing an image of an image dataset for a low-resolution print color before resolution conversion.

FIG. 8 is a diagram showing an image of an image dataset for the low-resolution print color after resolution conversion.

FIG. 9 is a diagram showing an image of an image dataset for black.

FIG. 10 is a diagram showing an image of image dataset for the low-resolution print color after density correction processing.

FIG. 11 is a diagram showing an example of a result of halftone processing on the image dataset for black.

FIG. 12 is a diagram showing an example of a result of halftone processing on the image dataset for the low-resolution print color.

DETAILED DESCRIPTION

Figure 1:
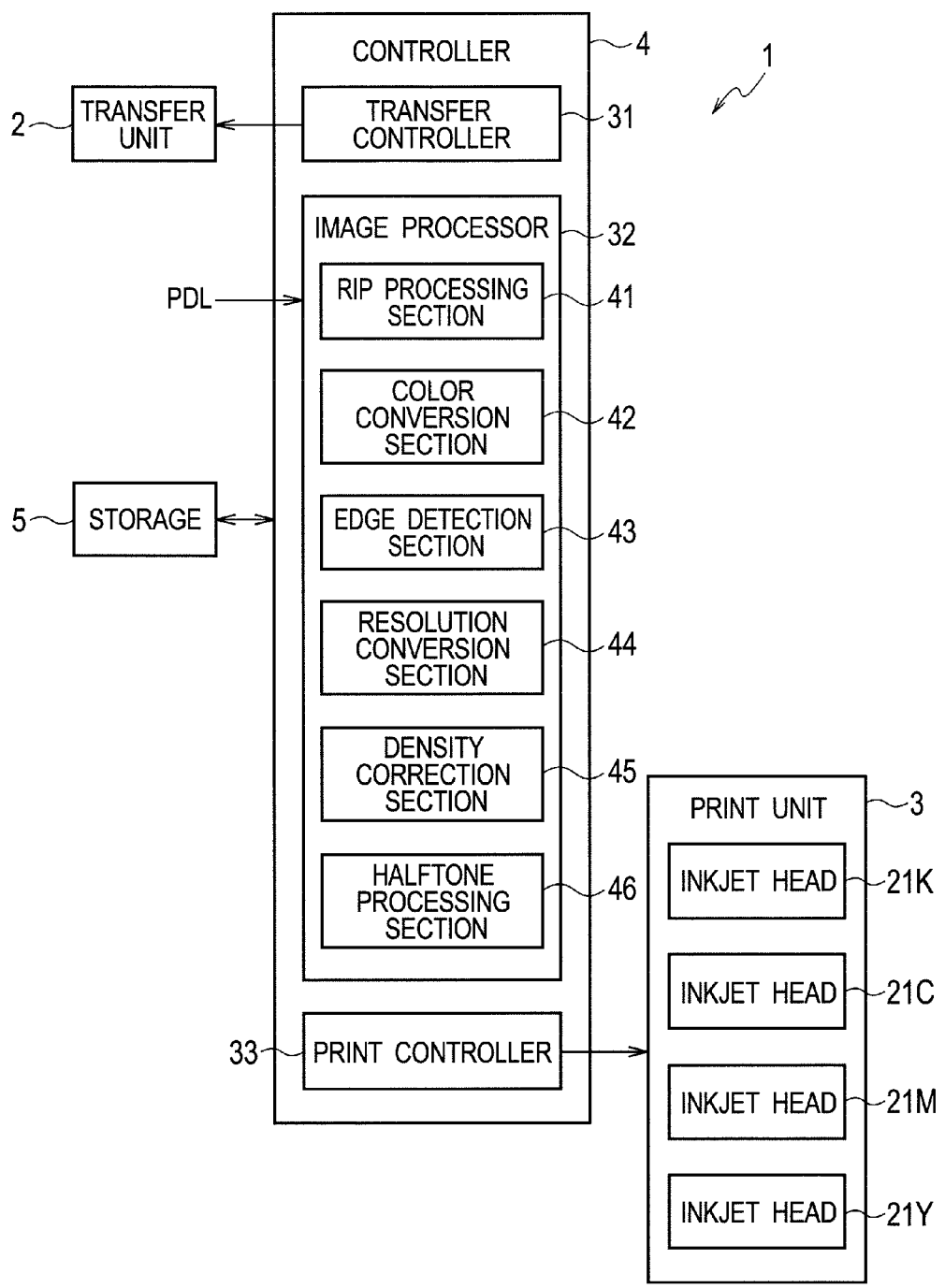
FIG. 1 is a block diagram showing the configuration of a printing machine according to an embodiment.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Description will be hereinbelow provided for an embodiment of the present invention by referring to the drawings. It should be noted that the same or similar parts and components throughout the drawings will be denoted by the same or similar reference signs, and that descriptions for such parts and components will be omitted or, simplified. In addition, it should be noted that the drawings are schematic and therefore different from the actual ones.

Figure 2:
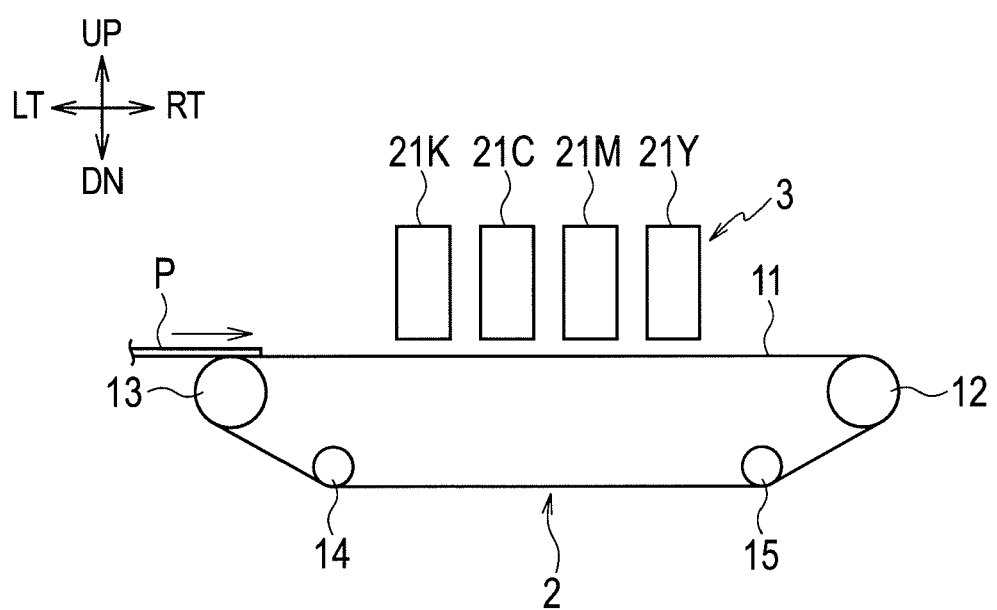
FIG. 2 is a schematic diagram showing the configurations of a transfer unit and a print unit of the printing machine according to the embodiment.

FIG. 1 is a block diagram showing the configuration of a printing machine according to an embodiment of the present invention. FIG. 2 is a schematic diagram showing the configurations of a transfer unit and a print unit of the printing machine shown in FIG. 1. Note that the following description assumes that a direction orthogonal to the paper plane of FIG. 2 is a front-rear direction with the near side of the paper plane being the front. In addition, the up, down, left, and right sides on the paper plane of FIG. 2 are up, down, left, and right directions, respectively. In the drawings, RT, LT, UP, and DN denote the rightward, leftward, upward, and downward directions, respectively.

As shown in FIG. 1, a printing machine 1 according to this embodiment includes a transfer unit 2, a print unit 3, a controller 4, and a storage 5.

The transfer unit 2 transfers a sheet P fed by a paper feeder (not shown). As shown in FIG. 2, the transfer unit 2 includes a transfer belt 11, a drive roller 12, and driven rollers 13, 14, 15.

The transfer belt 11 transfers a sheet P while sucking and retaining the sheet P. The transfer belt 11 is an endless belt looped around the drive roller 12 and driven rollers 13 to 15. The transfer belt 11 has belt holes, and sucks and retains the sheet P on the upper surface thereof using suction force generated in the belt holes by a driven fan (not shown). The transfer belt 11 rotates clockwise in FIG. 2 and thereby transfers the sheet P from left to right while sucking and retaining the sheet P.

The drive roller 12 supports the transfer belt 11 together with the driven rollers 13 to 15 and rotates the transfer belt 11. The drive roller 12 is driven by a motor (not shown).

The driven rollers 13 to 15 support the transfer belt 11 together with the drive roller 12. The driven rollers 13 to 15 are driven by the drive roller 12. The driven roller 13 is placed leftward of the drive roller 12, at substantially the same height as the drive roller 12. The driven rollers 14, 15 are placed at a lower level than the drive roller 12 and the driven roller 13, at substantially the same height as each other with a space in between in the left-right direction.

The print unit 3 prints an image by ejecting ink toward the sheet P transferred by the transfer unit 2. The print unit 3 includes inkjet heads 21K, 21C, 21M, and 21Y.

The inkjet heads 21K, 21C, 21M, and 21Y each have multiple nozzles (not shown) arranged in the main scan direction (the front-rear direction), and eject ink from the nozzles. The inkjet heads 21K, 21C, 21M, and 21Y are each configured to be able to change the number of ink droplets (drop number) ejected from one nozzle to one pixel, to perform tone-level printing where the density is represented by a drop number. The inkjet heads 21K, 21C, 21M, and 21Y are arranged above the transfer unit 2 side by side, with a predetermined space between them, in a sub scan direction (the left-right direction) which is the transfer direction of the sheet P.

The inkjet head 21K ejects black (K) ink from its nozzles. The nozzles of the inkjet head 21K are arranged in the main scan direction at intervals corresponding to a resolution of 600 dpi. The inkjet head 21K ejects ink from the nozzles at timing for achieving a resolution of 600 dpi in the sub scan direction. Thereby, black is printed at a resolution of 600×600 dpi. The resolution of 600×600 dpi corresponds to a first resolution. Black corresponds to a first-resolution print color.

The inkjet heads 21C, 21M, and 21Y eject cyan (C) ink, magenta (M) ink, and yellow (Y) ink, respectively, from their nozzles. The nozzles of the inkjet heads 21C, 21M, and 21Y are arranged in the main scan direction at intervals corresponding to a resolution of 300 dpi. The inkjet heads 21C, 21M, and 21Y eject ink from the nozzles at timing for achieving a resolution of 300 dpi in the sub scan direction. Thereby, cyan, magenta, and yellow are printed at a resolution of 300×300 dpi. The resolution of 300×300 dpi corresponds to a second resolution. In this embodiment, cyan, magenta, and yellow may be called low-resolution print colors (second-resolution print colors).

The controller 4 controls the overall operation of the printing machine 1. The controller 4 is configured of a CPU, a RAM, a ROM, and the like. The controller 4 includes a transfer controller 31, an image processor (image processing device) 32, and a print controller 33. The elements of the controller 4 are implemented when, for example, the CPU operates according to programs stored in the storage 5.

The transfer controller 31 controls the transfer unit 2 to transfer a sheet P.

The image processor 32 generates black, cyan, magenta, and yellow drop datasets (print image datasets) based on data in a PDL inputted from an external personal computer (PC) or the like. The drop datasets are image datasets in format printable with the inkjet heads 21K, 21C, 21M, and 21Y of the print unit 3. The drop datasets each represent the number of drops of ink to be ejected to each pixel.

The image processor 32 includes a RIP processing section 41, a color conversion section 42, an edge detection section 43, a resolution conversion section 44, a density correction section 45, and a halftone processing section (print image data generator) 46.

The RIP processing section 41 performs RIP processing on data in a PDL. The RIP processing section 41 performs the RIP processing at 600×600 dpi to conform to the print resolution for black. Thereby, image data (raster data) at 600×600 dpi is generated. In this embodiment, image data obtained by the RIP processing is image datasets represented in RGB, each color being 8 bit long (256 tone levels).

The color conversion section 42 performs color conversion processing to convert the image datasets in RGB format obtained by the RIP processing into image datasets in CMYK format, each color being 8 bit long. The color conversion section 42 performs the color conversion processing using a lookup table (not shown) recording the relations between RGB values and CMYK values. The color conversion processing generates 600×600-dpi image datasets for black, cyan, magenta, and yellow. These color image datasets are handled as original image datasets. The RIP processing section 41 and the color conversion section 42 form an original image data acquirer.

The edge detection section 43 detects longitudinal (vertical) edges and lateral (horizontal) edges of images in the 600×600-dpi image datasets for black, cyan, magenta, and yellow.

The resolution conversion section 44 converts the 600×600-dpi image datasets for the low-resolution print colors to 300×300-dpi image datasets by performing density averaging on each group of 2×2 pixels in the 600×600-dpi image datasets.

The density correction section 45 performs density correction processing on each of the resolution-converted datasets for the low-resolution print colors. Specifically, in the density correction processing, original-image longitudinal edge inclusion pixels and original-image lateral edge inclusion pixels are corrected in their intensities such that the intensities of deletion-target pixels are set to "0" and the intensities of other pixels are corrected to values equal to or larger than their original intensities. The original-image longitudinal edge inclusion pixels are each a pixel which is in a resolution-converted image dataset and corresponds to a position containing a longitudinal edge of an image in the image dataset before resolution conversion. The original-image lateral edge inclusion pixels are each a pixel which is in a resolution-converted image dataset and corresponds to a position containing a lateral edge of an image in the image dataset before resolution conversion. For each of the original-image longitudinal edge inclusion pixels and the original-image lateral edge inclusion pixels in a resolution-converted image dataset for a low-resolution print color, determination is made that the pixel is a deletion-target pixel when a region which corresponds to the pixel and is in an image in the image dataset for black contains an edge of the same pattern as a region which corresponds to the pixel and is in an image in the image dataset for the low-resolution print color before resolution conversion. Details of the density correction processing will be given later.

The halftone processing section 46 generates drop datasets for the respective colors by performing halftone processing on the 600×600-dpi image dataset for black and the 300×300-dpi, density-corrected image datasets for the low-resolution print colors. The halftone processing is processing for performing error diffusion processing and the like. In this embodiment, the drop dataset for black is data in which the number of drops is set in three levels, namely 0 to 2 drops, and the drop datasets for the low-resolution print colors are data in each of which the number of drops is set in eight levels, namely 0 to 7 drops.

The print controller 33 controls the driving of the inkjet heads 21K, 21C, 21M, and 21Y based on the drop datasets for the respective colors.

The storage 5 is configured of a hard disk drive (HDD) and the like. The storage 5 stores various programs. In addition, the storage 5 stores edge determination patterns 51, 52, 53, and 54 shown in FIGS. 3A, 3B, 3C, and 3D, respectively. The storage 5 also stores a gamma curve shown in FIG. 4 as a table.

Figures 3A, 3B, 3C, 3D, 4:
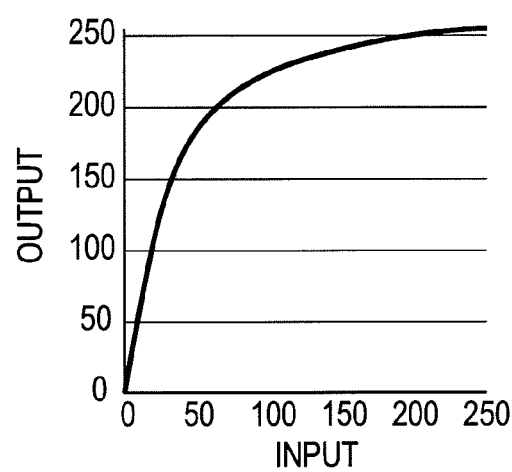
FIGS. 3A to 3D are diagrams each showing an edge determination pattern.
FIG. 4 is a diagram showing a gamma curve.

The edge determination patterns 51 to 54 shown in FIGS. 3A, 3B, 3C, and 3D are used by the edge detection section 43 to detect the longitudinal edges and the lateral edges of an image in each of the image datasets for the respective colors. The edge determination pattern 51 in FIG. 3A is used for detection of a longitudinal left edge. The edge determination pattern 52 in FIG. 3B is used for detection of a longitudinal right edge. The edge determination pattern 53 in FIG. 3C is used for detection of a lateral upper edge. The edge determination pattern 54 in FIG. 3D is used for detection of a lateral lower edge.

The gamma curve shown in FIG. 4 is used by the density correction section 45 to perform the density correction processing for correcting the density of a pixel to a value equal to or larger than its original density.

Next, operation of the printing machine 1 is described.

Figure 5:
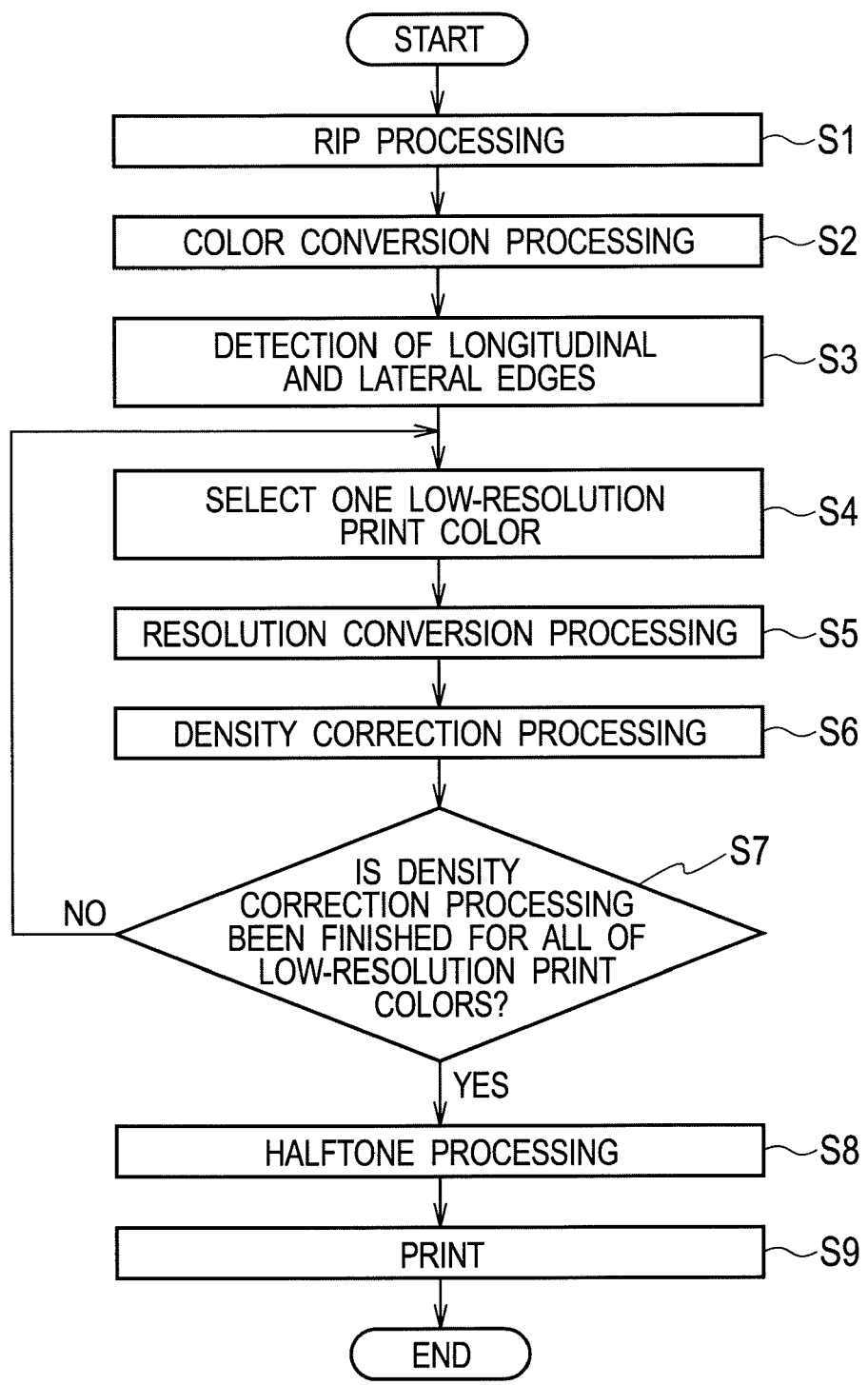
FIG. 5 is a flowchart illustrating operation of the printing machine.

FIG. 5 is a flowchart illustrating operation of the printing machine 1. The processing of the flowchart in FIG. 5 starts when data in a PDL is inputted to the printing machine 1.

In Step S1 in FIG. 5, the RIP processing section 41 performs RIP processing on the data in a PDL. The RIP processing section 41 performs the RIP processing at 600×600 dpi. The RIP processing section 41 thereby generates 600×600-dpi image datasets (raster data) for the respective colors of RGB.

Next, in Step S2, the color conversion section 42 performs color conversion processing on the RGB image datasets to generate image datasets for black, cyan, magenta, and yellow.

Next, in Step S3, the edge detection section 43 detects longitudinal edges and lateral edges of images in each of the 600×600-dpi image datasets for black, cyan, magenta, and yellow.

Specifically, first, the edge detection section 43 converts each pixel in each image dataset into binary representation according to the density of the pixel. Here, the edge detection section 43 uses "0" as the threshold for the binary conversion. The edge detection section 43 sets "1" for a pixel whose density is larger than "0", and sets "0" for a pixel whose density is "0".

Then, the edge detection section 43 scans a target region of 3×3 pixels in the image dataset, and determines whether a binary result in the target region matches any of the edge determination patterns 51 to 54. When the target region has an edge determination pattern that matches the binary result, the edge detection section 43 determines that the border between "0" and "1" in the edge determination pattern that matches the binary result is an edge of a pattern corresponding to the edge determination pattern.

Next, in Step S4, the resolution conversion section 44 selects one of the low-resolution print colors: cyan, magenta, and yellow.

Then, in Step S5, the resolution conversion section 44 performs density averaging to convert the resolution of the image dataset for the color selected in Step S4 from 600×600-dpi to 300×300-dpi. Specifically, the resolution conversion section 44 converts the resolution by setting the density of one pixel in the 300×300-dpi image dataset to an average density of a group of 2×2 pixels in the 600×600-dpi image dataset.

Next, in Step S6, the density correction section 45 performs density correction processing on the image dataset for the low-resolution print color, the resolution of which has been converted in Step S5. A procedure for the density correction processing will be described later.

Next, in Step S7, the density correction section 45 determines whether the density correction processing is finished for all the low-resolution print colors or not.

If the density correction section 45 determines that the density correction processing is not finished for all the low-resolution print colors (Step S7: NO), the processing returns to Step S4 where the next low-resolution print color is selected, and the processing after Step 4 is repeated.

If the density correction section 45 determines that the density correction processing is finished for all the low-resolution print colors (Step S7: YES), in Step S8, the halftone processing section 46 performs halftone processing on the image dataset for black and the density-corrected image dataset for each of the low-resolution print colors, and thereby generates drop datasets for the respective colors.

Next, in Step S9, the transfer controller 31 and the print controller 33 execute print operation. Specifically, the transfer controller 31 drives the transfer unit 2. When a sheet P is fed by the paper feeder (not shown), the transfer unit 2 transfers the sheet P. The print controller 33 drives the inkjet heads 21K, 21C, 21M, and 21Y based on the drop datasets for the respective colors to eject ink to the transferred sheet P. Thereby, an image is printed on the sheet P. With that, a series of processing is finished.

Figure 6:
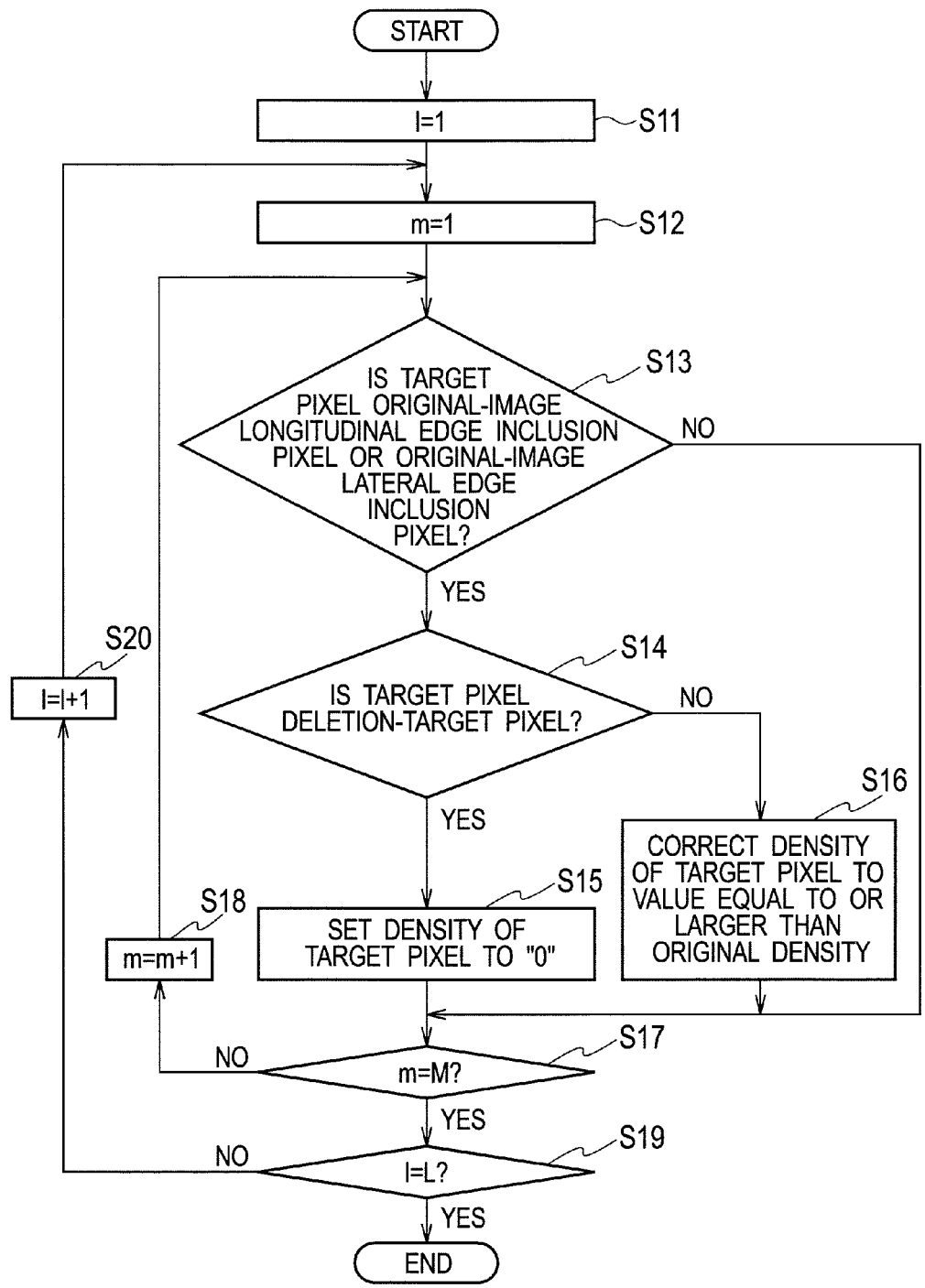
FIG. 6 is a flowchart of density correction processing.

Next, the density correction processing in Step S6 is described. FIG. 6 is a flowchart of the density correction processing.

First, in Step S11 in FIG. 6, the density correction section 45 sets "1" to a variable l indicating a line number in the resolution-converted image dataset for a low-resolution print color selected as a processing target.

Next, in Step S12, the density correction section 45 sets "1" to a variable m indicating a pixel number on the line.

Next, in Step S13, the density correction section 45 determines whether or not a target pixel which is the m-th pixel on the first line is an original-image longitudinal edge inclusion pixel or an original-image lateral edge inclusion pixel.

FIG. 7 shows an image of a 600×600-dpi image dataset for a low-resolution print color before resolution conversion. FIG. 8 shows an image of an image dataset obtained by converting the resolution of the image dataset in FIG. 7 to 300×300 dpi. FIGS. 7 and 8 show the image dataset for cyan. In FIGS. 7 and 8, one cell indicates one pixel, and the number inside the cell indicates density.

Lines LA1 and LA2 in FIG. 7 correspond to line LB1 in FIG. 8. Similarly, lines LA3 and LA4 correspond to line LB2, lines LA5 and LA6 correspond to line LB3, and lines LA7 and LA8 correspond to line LB4. The resolution conversion processing makes each pixel on line LB1 in FIG. 8, for example, have a density of "128" which is an average density of a group of 2×2 pixels on lines LA1 and LA2 in FIG. 7.

In FIG. 7, a border between line LA1 and LA2 and a border between line LA7 and LA8 are lateral edges. More specifically, the border between line LA1 and LA2 is a lateral upper edge, and the border between line LA7 and LA8 is a lateral lower edge.

Thus, in the resolution-converted image dataset for the low-resolution print color shown in FIG. 8, when a target pixel is for example a pixel on line LB1, a region which is in the image dataset in FIG. 7 and corresponds to the target pixel includes the lateral edge. Hence, when a target pixel is for example a pixel on line LB1 in FIG. 8, the density correction section 45 determines in Step S13 in FIG. 6 that the target pixel is an original-image lateral edge inclusion pixel. This also applies to a case where the target pixel is a pixel on line LB4.

If determining that the target pixel is neither an original-image longitudinal edge inclusion pixel nor an original-image lateral edge inclusion pixel in Step S13 in FIG. 6 (Step S13: NO), the density correction section 45 proceeds to processing in Step S17.

If determining that the target pixel is either an original-image longitudinal edge inclusion pixel or an original-image lateral edge inclusion pixel (Step S13: YES), the density correction section 45 determines whether the target pixel is a deletion-target pixel or not.

As described above, for each of original-image longitudinal edge inclusion pixels and original-image lateral edge inclusion pixels in a resolution-converted image dataset for a low-resolution print color, determination is made that the pixel is a deletion-target pixel when a region which corresponds to the pixel and is in an image in the image dataset for black contains an edge of the same pattern as a region which corresponds to the pixel and is in an image in the image dataset for the low-resolution print color before resolution conversion.

FIG. 9 shows an example of a 600×600-dpi image dataset for black corresponding to the image dataset for cyan shown in FIGS. 7 and 8. As described above, pixels on lines LB1, LB4 in FIG. 8 are original-image lateral edge inclusion pixels.

A region formed by lines LA7, LA8 in the image dataset for black in FIG. 9 which corresponds to line LB4 in FIG. 8 contains a lateral lower edge having the same pattern as a region formed by lines LA7, LA8 in the image dataset for cyan before resolution conversion in FIG. 7. Thus, the pixels on line LB4 in FIG. 8 are each a deletion-target pixel.

On the other hand, a region formed by lines LA1, LA2 in the image dataset for black in FIG. 9 which corresponds to line LB1 in FIG. 8 does not contain an edge. Thus, the pixels on line LB1 in FIG. 8 are not deletion-target pixels.

Hence, when a target pixel is one on line LB4 in FIG. 8 for example, the density correction section 45 determines, in Step S14 in FIG. 6, that the target pixel is a deletion-target pixel. On the other hand, when a target pixel is one on line LB1 in FIG. 8 for example, the density correction section 45 determines, in Step S14 in FIG. 6, that the target pixel is not a deletion-target pixel.

If determining that the target pixel is a deletion-target pixel in Step S14 in FIG. 6 (Step S14: YES), the density correction section 45 sets the density of the target pixel to "0" in Step S15.

Consequently, for example, the intensities of the pixels on line LB4 in FIG. 8 determined as deletion-target pixels are set to "0" as shown in FIG. 10. The pixels the intensities of which have been set to "0" are deleted from a printed image. After Step S15, the density correction section 45 proceeds to Step S17.

If determining that the target pixel is not a deletion-target pixel in Step S14 (Step S14: NO), the density correction section 45 corrects the density of the target pixel in Step S16 to a value equal to or larger than its original density. Specifically, the density correction section 45 performs density correction on the target pixel by using the gamma curve shown in FIG. 4.

Consequently, the intensities of the pixels on line LB1 in FIG. 8, which are original-image lateral edge inclusion pixels but not deletion-target pixels, are increased as shown in FIG. 10 (the 300×300-dpi image dataset for cyan). After Step S16, the density correction section 45 proceeds to Step S17.

In Step S17, the density correction section 45 determines whether not the variable m is M which indicates a final pixel on one line.

If determining that m is not M (Step S17: NO), the density correction section 45 increments the variable m by "1" in Step S18. Then, the density correction section 45 returns to Step S13.

If determining that m is M (Step S17: YES), the density correction section 45 determines in Step S19 whether or not the variable 1 is L which indicates a final line.

If determining that 1 is not L (Step S19: NO), the density correction section 45 increments the variable 1 by "1" in Step S20. Then, the density correction section 45 returns to Step S12.

If determining that 1 is L (Step S19: YES), the density correction section 45 ends the density correction processing.

As described earlier, the image datasets for the low-resolution print colors which have been subjected to the density correction processing as well as the image dataset for black are subjected to halftone processing (Step S8 in FIG. 5). Regarding the example described with FIGS. 7 to 10, FIG. 11 shows a 600×600-dpi drop dataset for black obtained as a result of the halftone processing on the image dataset for black in FIG. 9, and FIG. 12 shows a 300×300-dpi drop dataset for cyan obtained as a result of the halftone processing on the image dataset for cyan in FIG. 10. In FIGS. 11 and 12, the number in each cell indicates the number of drops.

Figure 13:
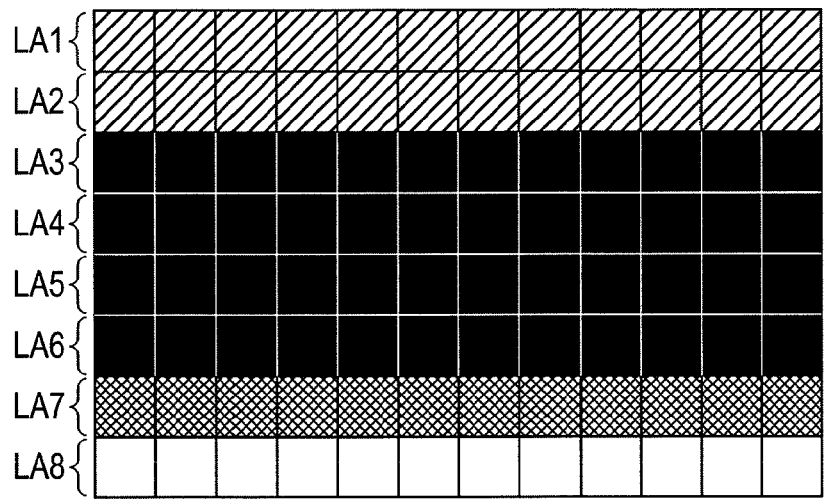
FIG. 13 is a diagram showing an image of a printed image.
Figure 14:
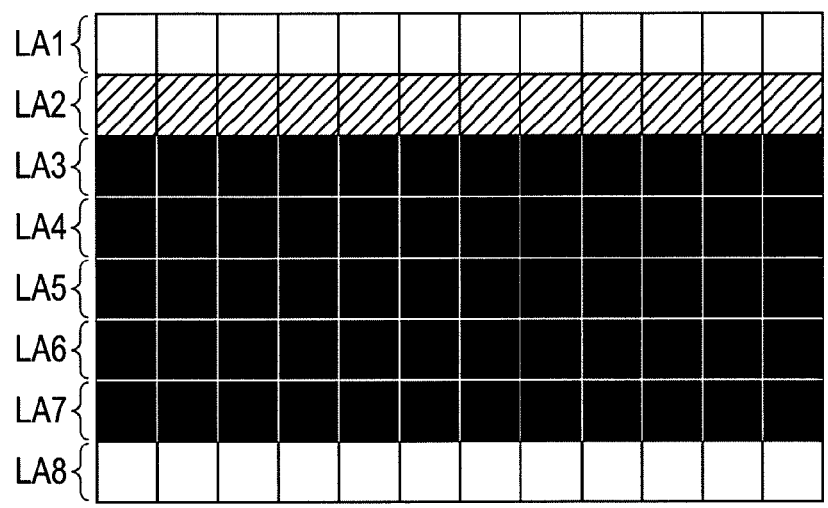
FIG. 14 is a diagram showing an image of original data.

FIG. 13 shows a printed image which is based on the drop datasets shown in FIGS. 11 and 12. In FIG. 13, cells filled in with black are printed as composites of black and cyan. FIG. 14 shows the original data for this example. FIG. 14 corresponds to an overlap of FIG. 7 with FIG. 9.

The printed image in FIG. 13 keeps the cyan region above the composite region of black and cyan in the original data in FIG. 14. Further, in the printed image in FIG. 13, like the original data in FIG. 14, cyan does not stick out downward of the composite region of black and cyan. Hence, the printed image in FIG. 13 is desirable.

The cyan region in FIG. 13 is printed with the density of the image dataset for cyan, which has been decreased by resolution conversion, being increased back by the density correction processing. If the image dataset is subjected to halftone processing with the intensities of those pixels being unchanged and low, small dots are formed for the pixels in the printed image with small numbers of drops. As a result, inter-dot gaps become large, making jaggedness or the like tend to stand out. However, since the cyan region in FIG. 13 is printed with the intensities being increased by the density correction processing, such jaggedness or the like is suppressed.

Figure 15:
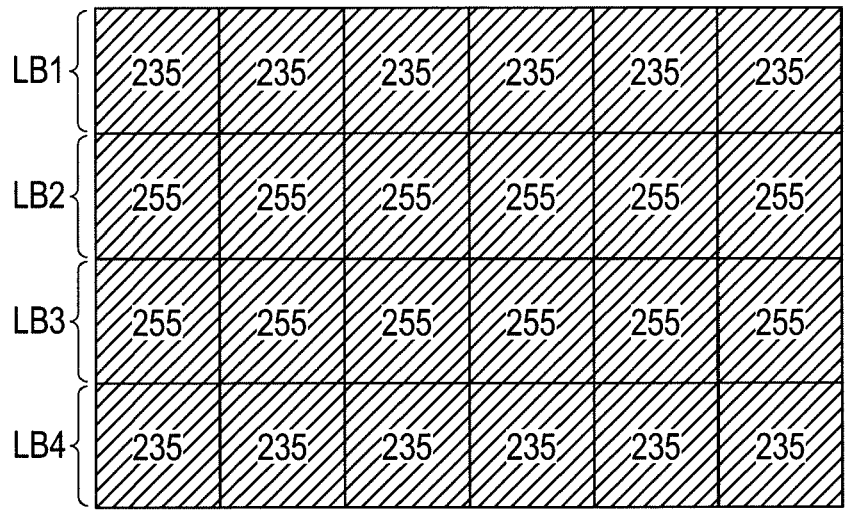
FIG. 15 is a diagram showing an image of an image dataset for the low-resolution print color after density correction processing, according to a comparative example.

FIG. 15 shows a 300×300-dpi image dataset for cyan after density correction processing which, unlike this embodiment, does not set the intensities of the deletion-target pixels to "0" in the resolution-converted image dataset for cyan in FIG. 8 but corrects those intensities to values equal to or larger than their original intensities. In the image dataset in FIG. 15, unlike the image dataset in FIG. 10, the intensities of the pixels on line LB4 are the same as those on line LB1.

Figure 16:
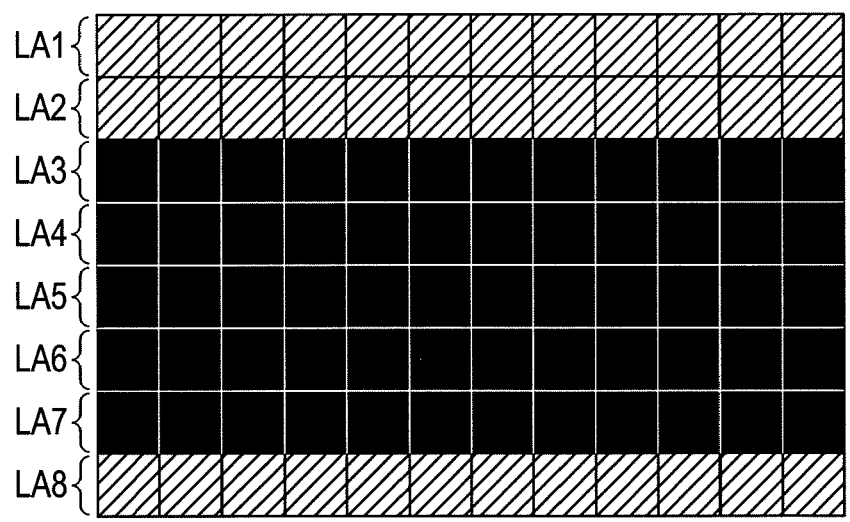
FIG. 16 is a diagram showing an image of a printed image according to the comparative example.

For this reason, a printed image based on drop datasets obtained by performing halftone processing on the image dataset in FIG. 15 and the drop dataset for black in FIG. 11 is as shown in FIG. 16. The printed image in FIG. 16 is not desirable because cyan sticks out downward of the composite region of black and cyan, unlike the printed image in FIG. 13 and the original data in FIG. 14.

As described thus far, in the printing machine 1, the image processor 32 performs RIP processing at a high resolution (600×600 dpi) and converts the resolution of an image dataset for a low-resolution print color to a low resolution of 300×300 dpi through density averaging. When an image is printed by use of the image dataset thus converted in resolution through the density averaging, the low-resolution print color attains the text smoothing effect. In other words, slanted contours or the like of text look smooth.

In the printing machine 1, the density correction section 45 of the image processor 32 corrects the intensities of pixels in a resolution-converted image dataset for a low-resolution print color to values equal to or larger than their original intensities, the corrected pixels being original-image longitudinal edge inclusion pixels and original-image lateral edge inclusion pixels except for deletion-target pixels. This enables suppression of jaggedness or the like of a longitudinal or lateral line or the like of the low-resolution print color in a printed image. Further, the density correction section 45 corrects the density of each deletion-target pixel to "0". This enables suppression of a low-resolution print color sticking out from black in a printed image. Thus, the image processor 32 can mitigate degradation of the quality of an image printed by the printing machine 1.

The correction of the density of each deletion-target pixel to "0" may be omitted depending on the color of the low-resolution print color. Specifically, the correction of the density of each deletion-target pixel to "0" may be omitted for yellow. This is because yellow has high brightness and therefore does not stand out even if it sticks out from black in a printed image. This allows reduction in time required for image processing.

In the configuration described in the above embodiment, black is a high-resolution print color, and cyan, magenta, and yellow are low-resolution print colors. Alternatively, a color other than black may be a high-resolution print color. In such a case, the correction of the density of each deletion-target pixel in a low-resolution print color to "0" may be omitted depending on a combination of the high-resolution print color and a low-resolution print color. For example, the correction of the density of each deletion-target pixel to "0" may be omitted for a low-resolution print color whose brightness is higher than the high-resolution print color by a predetermined value or more.

Moreover, although only black is the high-resolution print color in the embodiment described above, there may be multiple high-resolution print colors. In such a case, the density correction section 45 may determine that an original-image longitudinal edge inclusion pixel or an original-image lateral edge inclusion pixel in a resolution-converted image dataset for a low-resolution print color is a deletion-target pixel when a region which corresponds to the edge inclusion pixel and is in an image in an image dataset for at least one of the high-resolution print colors contains an edge of the same pattern as a region which corresponds to the edge inclusion pixel and is in an image in the image dataset for the low-resolution print color before resolution conversion.

Further, although the printing machine 1 receives data in a PDL and performs print operation in the above embodiment, the present invention is also applicable to a case of printing an image on an original scanned with a scanner. In such a case, the image processor 32 acquires high-resolution (600×600-dpi) image data in RGB format generated by scanning the original and subjects the image data to processing similar to that in the above embodiment to generate drop datasets.

Although high-resolution is 600×600 dpi and low-resolution is 300×300 dpi in the printing machine 1 of the above embodiment, the combination of resolutions is not limited to this.

Although the printing machine 1 is an inkjet printing machine in the above embodiment, the present invention is applicable to a printing machine employing other printing method.

Although the printing machine 1 has the controller 4 including the image processor (image processing device) 32 in the above embodiment, the image processor (image processing device) 32 may be provided separately from the controller 4 of the printing machine 1. Specifically, the following configuration may be employed: the controller 4 of the printing machine 1 receives print image datasets generated by the image processor (image processing device) 32 provided separately, and causes the print unit 3 to print the print image datasets. Such a configuration can be achieved as follows, for example. Among the programs stored in the storage 5, programs for processing performed by the image processor (image processing device) 32 provided separately are stored in a different storage. Then, according to the programs stored in the different storage, the CPU operates the image processor (image processing device) 32 provided separately.

Embodiments of the present invention have been described above. However, the invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

Moreover, the effects described in the embodiments of the present invention are only a list of optimum effects achieved by the present invention. Hence, the effects of the present invention are not limited to those described in the embodiment of the present invention.

What is claimed is:

1. An image processing device comprising:
an original image data acquirer configured to acquire original image datasets for a plurality of colors each having a first resolution, the plurality of colors including a first-resolution print color to be printed at the first resolution and a second-resolution print color to be printed at a second resolution lower than the first resolution and different from the first-resolution print color, the original image datasets including a first original image dataset for the first-resolution print color and a second original image dataset for the second-resolution print color;
an edge detector configured to detect a longitudinal edge and a lateral edge of each of a first image in the first original image dataset and a second image in the second original image dataset;
a resolution converter configured to convert the first resolution of the second original image dataset into the second resolution by performing a density averaging on each group of a plurality of pixels of the second original image dataset having the first resolution, to obtain a resolution-converted image dataset;
a density corrector configured to perform a density correction processing on the resolution-converted image dataset to obtain a density-corrected image dataset by
determining whether pixels in the resolution-converted image dataset include first pixels each being a pixel located at a position including the longitudinal edge in the second image,
determining whether the pixels in the resolution-converted image dataset include second pixels each being a pixel located at a position including the lateral edge in the second image,
upon determining that the pixels include the first pixels, determining whether each of the first pixels is a first deletion-target pixel, patterns of the longitudinal edges in regions in the first and second images corresponding to the first deletion-target pixel being the same,
upon determining that the pixels include the second pixels, determining whether each of the second pixels is a second deletion-target pixel, patterns of the longitudinal edges in regions in the first and second images corresponding to the second deletion-target pixel being the same, correcting a density of the first and second deletion-target pixels to "0", and correcting a density of respective pixels other than the first and second deletion-target pixels among the first and second pixels to a value equal to or larger than an original density of the respective pixels; and a print image data generator configured to generate print image datasets for the respective plurality of colors based on the first original dataset and the density-corrected image dataset, the print image datasets being in a format supported by a printing machine capable of printing the first-resolution print color at the first resolution and the second-resolution print color at the second resolution.

2. The image processing device according to claim 1, wherein depending on a combination of the second-resolution print color and the first-resolution print color, the density corrector is configured to omit the correction of the density of the first and second deletion-target pixels to "0" in the resolution-converted image dataset.

* * * * *